US012657472B1

(12) United States Patent
Go

(10) Patent No.: US 12,657,472 B1
(45) Date of Patent: Jun. 16, 2026

(54) METHOD FOR TRAINING VISUAL GROUNDING MODEL BY USING PSEUDO LABEL OF IMAGE AND LEARNING DEVICE USING THE SAME

(71) Applicant: SUPERB AI CO., LTD., Seoul (KR)

(72) Inventor: Kyeongryeol Go, Seoul (KR)

(73) Assignee: SUPERB AI CO., LTD., Seoul (KR)

( * ) Notice: Subject to any disclaimer, the term of this patent is extended or adjusted under 35 U.S.C. 154(b) by 5 days.

(21) Appl. No.: 19/382,375

(22) Filed: Nov. 7, 2025

(30) Foreign Application Priority Data

Oct. 13, 2025 (KR) ........................ 10-2025-0146697

(51) Int. Cl.
| | |
|---|---|
| *G06N 3/0895* | (2023.01) |
| *G06N 3/0455* | (2023.01) |
| *G06V 10/26* | (2022.01) |
| *G06V 10/82* | (2022.01) |
| *G06V 20/70* | (2022.01) |

(52) U.S. Cl.
CPC ......... *G06N 3/0895* (2023.01); *G06N 3/0455* (2023.01); *G06V 10/26* (2022.01); *G06V 10/82* (2022.01); *G06V 20/70* (2022.01)

(58) Field of Classification Search
CPC ...... G06N 3/0895; G06N 3/0455; G06N 3/08; G06N 20/00; G06V 10/26; G06V 10/82; G06V 20/70; G06V 10/774; G06V 20/56; G06V 10/98; G06T 7/11; G06T 7/187; G06T 7/136; G06F 18/00; G06F 18/2155; B60W 40/06

See application file for complete search history.

(56) References Cited

U.S. PATENT DOCUMENTS

| | | | |
|---|---|---|---|
| 12,482,255 B1 * | 11/2025 | Azad | ........................ G06N 3/08 |
| 2024/0203085 A1 * | 6/2024 | Bangalath | ............. G06T 1/0021 |
| 2024/0331419 A1 | 10/2024 | Ye et al. | |
| 2025/0265826 A1 | 8/2025 | Maniadis Metaxas et al. | |

FOREIGN PATENT DOCUMENTS

| | | |
|---|---|---|
| KR | 1020230018277 A | 2/2024 |
| KR | 1020240075106 A | 5/2024 |

OTHER PUBLICATIONS

Chun et al ("Probabilistic Embeddings for Cross-Modal Retrieval", 2021 IEEE/CVF Conference on Computer Vision and Pattern Recognition (CVPR), p. 8411-8420) (Year: 2021).*

* cited by examiner

*Primary Examiner* — Duy M Dang
(74) *Attorney, Agent, or Firm* — Maschoff Brennan

(57) ABSTRACT

A method for training a visual grounding model by using a pseudo label of an image is provided. The method includes (a) (i) inputting the training image and the first object category names to the visual grounding model, to thereby allow the visual grounding model to generate (i-1) first text embedding vectors (i-2) an image embedding vector, and (i-3) proposals, to thereby align each of proposal embedding vectors with each of the corresponding first text embedding vectors, and thus generate object detection results of detecting the first objects corresponding to the first object category names in the training image, and (ii) inputting, to the visual grounding model, one or more cropped images corresponding to second object bounding boxes, to generate second visual embedding vectors, and thus generate image captions corresponding to the cropped images.

18 Claims, 6 Drawing Sheets

FIG. 2

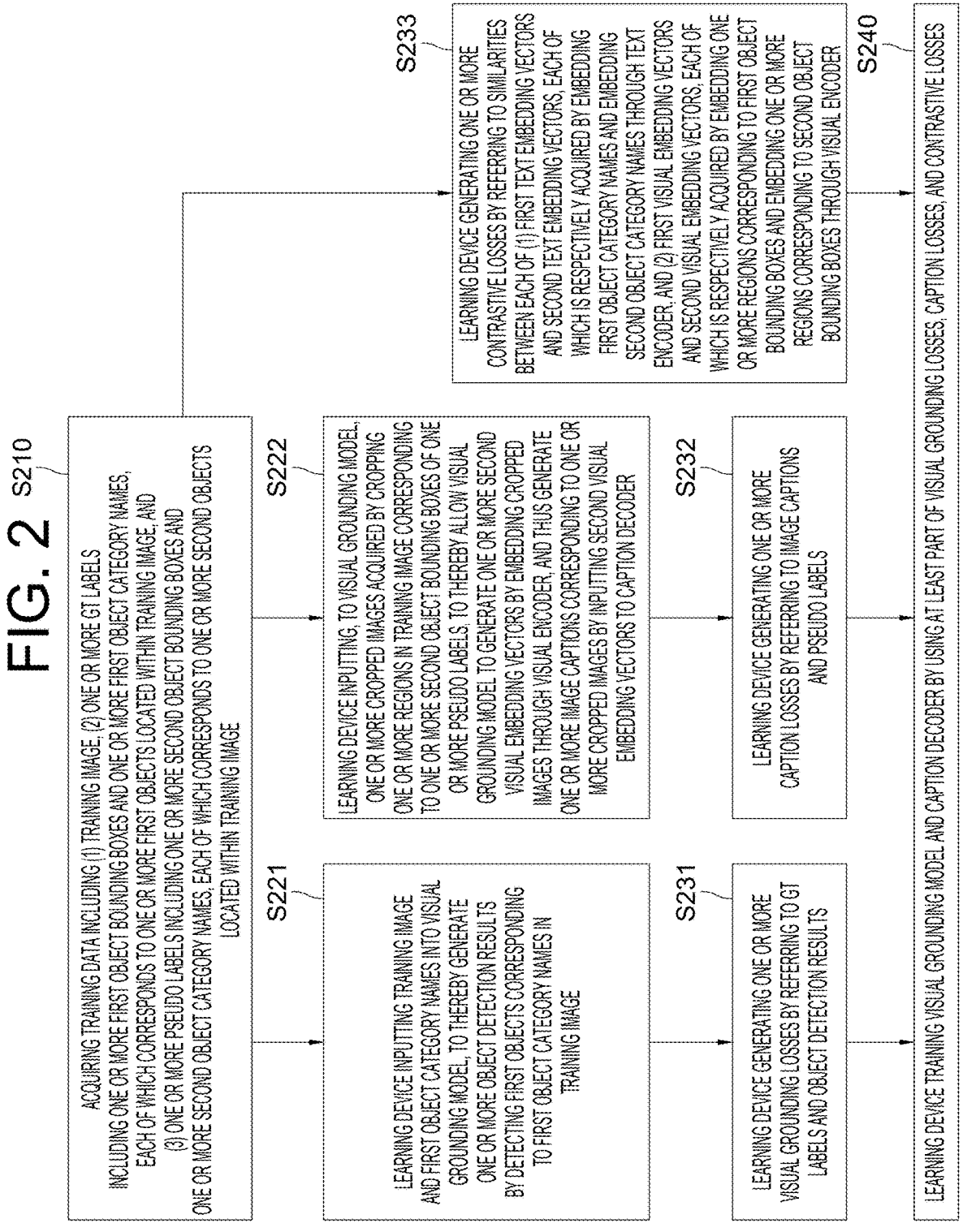

S210

ACQUIRING TRAINING DATA INCLUDING (1) TRAINING IMAGE, (2) ONE OR MORE GT LABELS INCLUDING ONE OR MORE FIRST OBJECT BOUNDING BOXES AND ONE OR MORE FIRST OBJECT CATEGORY NAMES, EACH OF WHICH CORRESPONDS TO ONE OR MORE FIRST OBJECTS LOCATED WITHIN TRAINING IMAGE, AND (3) ONE OR MORE PSEUDO LABELS INCLUDING ONE OR MORE SECOND OBJECT BOUNDING BOXES AND ONE OR MORE SECOND OBJECT CATEGORY NAMES, EACH OF WHICH CORRESPONDS TO ONE OR MORE SECOND OBJECTS LOCATED WITHIN TRAINING IMAGE

S221

LEARNING DEVICE INPUTTING TRAINING IMAGE AND FIRST OBJECT CATEGORY NAMES INTO VISUAL GROUNDING MODEL, TO THEREBY GENERATE ONE OR MORE OBJECT DETECTION RESULTS BY DETECTING FIRST OBJECTS CORRESPONDING TO FIRST OBJECT CATEGORY NAMES IN TRAINING IMAGE

S222

LEARNING DEVICE INPUTTING, TO VISUAL GROUNDING MODEL, ONE OR MORE CROPPED IMAGES ACQUIRED BY CROPPING ONE OR MORE REGIONS IN TRAINING IMAGE CORRESPONDING TO ONE OR MORE SECOND OBJECT BOUNDING BOXES OF ONE OR MORE PSEUDO LABELS TO THEREBY ALLOW VISUAL GROUNDING MODEL TO GENERATE ONE OR MORE SECOND VISUAL EMBEDDING VECTORS BY EMBEDDING CROPPED IMAGES THROUGH VISUAL ENCODER, AND THUS GENERATE ONE OR MORE IMAGE CAPTIONS CORRESPONDING TO ONE OR MORE CROPPED IMAGES BY INPUTTING SECOND VISUAL EMBEDDING VECTORS TO CAPTION DECODER

S233

LEARNING DEVICE GENERATING ONE OR MORE CONTRASTIVE LOSSES BY REFERRING TO SIMILARITIES BETWEEN EACH OF (1) FIRST TEXT EMBEDDING VECTORS AND SECOND TEXT EMBEDDING VECTORS, EACH OF WHICH IS RESPECTIVELY ACQUIRED BY EMBEDDING FIRST OBJECT CATEGORY NAMES AND EMBEDDING SECOND OBJECT CATEGORY NAMES THROUGH TEXT ENCODER, AND (2) FIRST VISUAL EMBEDDING VECTORS AND SECOND VISUAL EMBEDDING VECTORS, EACH OF WHICH IS RESPECTIVELY ACQUIRED BY EMBEDDING ONE OR MORE REGIONS CORRESPONDING TO FIRST OBJECT BOUNDING BOXES AND EMBEDDING ONE OR MORE REGIONS CORRESPONDING TO SECOND OBJECT BOUNDING BOXES THROUGH VISUAL ENCODER

S231

LEARNING DEVICE GENERATING ONE OR MORE VISUAL GROUNDING LOSSES BY REFERRING TO GT LABELS AND OBJECT DETECTION RESULTS

S232

LEARNING DEVICE GENERATING ONE OR MORE CAPTION LOSSES BY REFERRING TO IMAGE CAPTIONS AND PSEUDO LABELS

S240

LEARNING DEVICE TRAINING VISUAL GROUNDING MODEL AND CAPTION DECODER BY USING AT LEAST PART OF VISUAL GROUNDING LOSSES, CAPTION LOSSES, AND CONTRASTIVE LOSSES

METHOD FOR TRAINING VISUAL GROUNDING MODEL BY USING PSEUDO LABEL OF IMAGE AND LEARNING DEVICE USING THE SAME

CROSS REFERENCE OF RELATED APPLICATION

This present application claims the benefit of the earlier filing date of Korean non-provisional patent application No. 10-2025-0146697, filed on Oct. 13, 2025, the entire contents of which being incorporated herein by reference.

FIELD OF THE DISCLOSURE

The present disclosure is related to a method and a learning device for training a visual grounding model by using a pseudo label of an image; and more particularly, to a training method and a learning device that trains the visual grounding model by using training data including (1) a training image, (2) one or more GT labels including one or more first object bounding boxes and one or more first object category names, each of which corresponds to one or more first objects located within the training image, and (3) one or more pseudo labels including one or more second object bounding boxes and one or more second object category names, each of which corresponds to one or more second objects located within the training image, while distinguishing each of losses used by each of the GT labels and the pseudo labels, thereby allowing the visual grounding model to maintain an object detection performance through the GT labels and extend to an OWOD (Open World Object Detection) through the pseudo labels.

BACKGROUND OF THE DISCLOSURE

A visual grounding model is a model capable of accurately identifying a specific location or region within an image based on an input image and a natural language text inputted by a user. Therefore, the visual grounding model goes beyond simple image classification or object detection. For example, research on the visual grounding model is being actively pursued with the aim of applying it in various industrial fields, such as a quality control, an inventory management, and a security monitoring. This is because the visual grounding model is able to visually understand and execute complex and subtle human instructions, such as locating specific linguistic references (e.g., "damaged box" or "minor scratch") within the image.

Conventionally, the visual grounding model has been trained by using training data labeled with fixed category names (e.g., in COCO dataset there are 80 fixed category names) for objects located within training images. Herein, the fixed category names may be coarse-grained category names, such as people, car, bicycle, tree, etc. Therefore, the visual grounding model trained using these training data may have limitations when applied to open-world object detection because they may struggle to distinguish fine-grained category names that may be expressed as long phrases or sentence-form texts inputted by the user.

To address the above issues, two methods of (i) additionally constructing a new dataset to train the visual grounding model, and (ii) additionally adding pseudo labels generated from a visual foundation model to the training data for training the visual grounding model have been attempted. However, in the case of said (i), the cost required to additionally build and manage the new dataset may increase and a time required to train the visual grounding model may also increase, which results in an inefficiency. And, in the case of said (ii), the visual grounding model is trained by indiscriminately using the existing labels and the pseudo labels, therefore, even if more labels for a same data is available, the visual grounding model trained in this way may have a problem with a performance of an object detection for the existing labels being decreased.

Therefore, an improvement for solving these problems is required.

SUMMARY OF THE DISCLOSURE

It is an object of the present disclosure to solve all the aforementioned problems.

It is another object of the present disclosure to improve an open-world object detection performance of a visual grounding model while maintaining an object detection performance of the visual grounding model for existing GT labels, by adding pseudo labels generated from a visual foundation model to existing training data for training the visual grounding model and by differentiating each of losses utilized by each of the existing GT labels and the pseudo-labels.

In order to accomplish objects above and characteristic effects to be described later of the present disclosure, distinctive structures of the present disclosure are described as follows.

In accordance with one aspect of the present disclosure, there is provided a method for training a visual grounding model by using a pseudo label of an image, including steps of: (a) in response to acquiring, by a learning device, training data including (1) a training image, (2) one or more GT labels including one or more first object bounding boxes and one or more first object category names, each of which corresponds to one or more first objects located within the training image, and (3) one or more pseudo labels including one or more second object bounding boxes and one or more second object category names, each of which corresponds to one or more second objects located within the training image, which are either same objects as the first objects or different objects, wherein the first object category names are coarse-grained category names corresponding to the first objects and the second object category names are fine-grained category names corresponding to the second objects, performing, by the learning device, sub-processes of (i) inputting the training image and the first object category names to the visual grounding model, to thereby allow the visual grounding model to (i–1) generate one or more first text embedding vectors by embedding the first object category names through a text encoder, (i–2) generate an image embedding vector by embedding the training image through a visual encoder, (i–3) generate one or more proposals, which are regions in the training image where objects are predicted to be located, by using the image embedding vector through a detection head, to thereby align each of proposal embedding vectors of the proposals with each of the corresponding first text embedding vectors, and thus generate one or more object detection results of detecting the first objects corresponding to the first object category names in the training image, and (ii) inputting, to the visual grounding model, one or more cropped images acquired by cropping one or more regions in the training image corresponding to said one or more second object bounding boxes of said one or more pseudo labels, to thereby allow the visual grounding model to generate one or more second visual embedding vectors by embedding the cropped images through the visual encoder, and thus generate one or more image captions corresponding to said one or more cropped images by inputting the second visual embedding vectors to a caption decoder; and (b) performing, by the learning device, a sub-process of generating one or more visual grounding losses by referring to the GT labels and the object detection results, a sub-process of generating one or more caption losses by referring to the image captions and the pseudo labels, and a sub-process of generating one or more contrastive losses by referring to similarities between each of (1) the first text embedding vectors and one or more second text embedding vectors, each of which is respectively acquired by embedding the first object category names of the GT labels and embedding the second object category names of the pseudo labels through the text encoder, and (2) one or more first visual embedding vectors and the second visual embedding vectors, each of which is respectively acquired by embedding one or more regions corresponding to the first object bounding boxes of the GT labels and embedding one or more regions corresponding to the second object bounding boxes of the pseudo labels through the visual encoder, to thereby train the visual grounding model and the caption decoder by using at least part of the visual grounding losses, the caption losses, and the contrastive losses.

As one example, at the step of (b), while generating the contrastive losses by referring to the similarities between (1) each of the first text embedding vectors and the second text embedding vectors and (2) each of the first visual embedding vectors and the second visual embedding vectors, the learning device generates the contrastive losses by using only a subset of the pseudo labels corresponding to a subset of the second object bounding boxes, wherein IOUs (Intersection Over Union) between the subset of the second object bounding boxes and the first object bounding boxes of the GT labels are less than or equal to a preset threshold IOU.

As one example, at the step of (b), the learning device generates the contrastive losses by using additional one or more negative text embedding vectors acquired by embedding one or more negative object category names through the text encoder, wherein the negative object category names are category names that are different from the first object category names and the second object category names.

As one example, at the step of (a), the GT labels include the first object bounding boxes and the first object category names, wherein (i) (i–1) the first object bounding boxes include a (1_1)-st object bounding box to a (1_n)-th object bounding box corresponding to a (1_1)-st object to a (1_n)-th object included in the first objects and (i–2) the first object category names include a (1_1)-st object category name to a (1_n)-th object category name, and the pseudo labels include the second object bounding boxes and the second object category names, wherein (ii) (ii–1) the second object bounding boxes include a (2_1)-st object bounding box to a (2_m)-th object bounding box corresponding to a (2_1)-st object to a (2_m)-th object included in the second objects and (ii–2) the second object category names include a (2_1)-st object category name to a (2_m)-th object category name, and wherein, at the step of (b), the learning device generates the contrastive losses by referring to similarities between (1) each of a (1_1)-st text embedding vector to a (1_n)-th text embedding vector and a (2_1)-st text embedding vector to a (2_m)-th text embedding vector, each of which is respectively acquired by embedding each of the (1_1)-st object category name to the (1_n)-th object category and the (2_1)-st object category name to the (2_m)-th object category name through the text encoder, and (2) each of a (1_1)-st visual embedding vector to a (1_n)-th visual embedding vector and a (2_1)-st visual embedding vector to a (2_m)-th visual embedding vector, each of which is respectively acquired by embedding each of regions corresponding to the (1_1)-st object bounding box to the (1_n)-th object bounding box and regions corresponding to the (2_1)-st object bounding box to the (2_m)-th object bounding box through the visual encoder.

As one example, at the step of (b), the learning device generates the caption losses either by referring to similarities between all of the second object category names of the pseudo labels and all of the image captions, or by referring to similarities between part of one or more key words, noun phrases, and verbs extracted from each of the second object category names and part of one or more key words, noun phrases, and verbs extracted from each of the image captions.

As one example, at the step of (b), the learning device generates (i) class losses by referring to predicted class names of the first objects and the first object category names of the GT labels, wherein the predicted class names are acquired by referring to the object detection results, and (ii) the visual grounding losses by referring to the class losses and bounding box losses, wherein the bounding box losses are generated by referring to the proposals and the first object bounding boxes of the GT labels.

As one example, the learning device generates the class losses by using contrastive losses between (1) the proposal embedding vectors and (2) the first text embedding vectors corresponding to the first object category names.

As one example, at the step of (b), the learning device generates the bounding box losses by using L1 losses and GIOU (Generalized Intersection Over Union) losses, which are generated by referring to the proposals and the first object bounding boxes.

As one example, the pseudo labels including the second object bounding boxes corresponding to the second objects of the training image and the second object category names corresponding to the second objects of the training image are generated through a vision foundation model.

In accordance with another aspect of the present disclosure, there is provided a learning device for training a visual grounding model by using a pseudo label of an image, including: at least one memory that stores instructions; and at least one processor configured to execute the instructions to perform processes of: (I) in response to acquiring training data including (1) a training image, (2) one or more GT labels including one or more first object bounding boxes and one or more first object category names, each of which corresponds to one or more first objects located within the training image, and (3) one or more pseudo labels including one or more second object bounding boxes and one or more second object category names, each of which corresponds to one or more second objects located within the training image, which are either same objects as the first objects or different objects, wherein the first object category names are coarse-grained category names corresponding to the first objects and the second object category names are fine-grained category names corresponding to the second objects, (i) inputting the training image and the first object category names to the visual grounding model, to thereby allow the visual grounding model to (i–1) generate one or more first text embedding vectors by embedding the first object category names through a text encoder, (i–2) generate an image embedding vector by embedding the training image through a visual encoder, (i–3) generate one or more proposals, which are regions in the training image where objects are predicted to be located, by using the image embedding vector through a detection head, to thereby align each of proposal embedding vectors of the proposals with each of the corresponding first text embedding vectors, and thus generate one or more object detection results of detecting the first objects corresponding to the first object category names in the training image, and (ii) inputting, to the visual grounding model, one or more cropped images acquired by cropping one or more regions in the training image corresponding to said one or more second object bounding boxes of said one or more pseudo labels, to thereby allow the visual grounding model to generate one or more second visual embedding vectors by embedding the cropped images through the visual encoder, and thus generate one or more image captions corresponding to said one or more cropped images by inputting the second visual embedding vectors to a caption decoder; and (II) generating one or more visual grounding losses by referring to the GT labels and the object detection results, generating one or more caption losses by referring to the image captions and the pseudo labels, and generating one or more contrastive losses by referring to similarities between each of (1) the first text embedding vectors and one or more second text embedding vectors, each of which is respectively acquired by embedding the first object category names of the GT labels and embedding the second object category names of the pseudo labels through the text encoder, and (2) one or more first visual embedding vectors and the second visual embedding vectors, each of which is respectively acquired by embedding one or more regions corresponding to the first object bounding boxes of the GT labels and embedding one or more regions corresponding to the second object bounding boxes of the pseudo labels through the visual encoder, to thereby train the visual grounding model and the caption decoder by using at least part of the visual grounding losses, the caption losses, and the contrastive losses.

As one example, at the process of (II), while generating the contrastive losses by referring to the similarities between (1) each of the first text embedding vectors and the second text embedding vectors and (2) each of the first visual embedding vectors and the second visual embedding vectors, the processor generates the contrastive losses by using only a subset of the pseudo labels corresponding to a subset of the second object bounding boxes, wherein IOUs (Intersection Over Union) between the subset of the second object bounding boxes and the first object bounding boxes of the GT labels are less than or equal to a preset threshold IOU.

As one example, at the process of (II), the processor generates the contrastive losses by using additional one or more negative text embedding vectors acquired by embedding one or more negative object category names through the text encoder, wherein the negative object category names are category names that are different from the first object category names and the second object category names.

As one example, at the process of (I), the GT labels include the first object bounding boxes and the first object category names, wherein (i) (i–1) the first object bounding boxes include a (1_1)-st object bounding box to a (1_n)-th object bounding box corresponding to a (1_1)-st object to a (1_n)-th object included in the first objects and (i–2) the first object category names include a (1_1)-st object category name to a (1_n)-th object category name, and the pseudo labels include the second object bounding boxes and the second object category names, wherein (ii) (ii–1) the second object bounding boxes include a (2_1)-st object bounding box to a (2_m)-th object bounding box corresponding to a (2_1)-st object to a (2_m)-th object included in the second objects and (ii–2) the second object category names include a (2_1)-st object category name to a (2_m)-th object category name, and wherein, at the process of (II), the processor generates the contrastive losses by referring to similarities between (1) each of a (1_1)-st text embedding vector to a (1_n)-th text embedding vector and a (2_1)-st text embedding vector to a (2_m)-th text embedding vector, each of which is respectively acquired by embedding each of the (1_1)-st object category name to the (1_n)-th object category and the (2_1)-st object category name to the (2_m)-th object category name through the text encoder, and (2) each of a (1_1)-st visual embedding vector to a (1_n)-th visual embedding vector and a (2_1)-st visual embedding vector to a (2_m)-th visual embedding vector, each of which is respectively acquired by embedding each of regions corresponding to the (1_1)-st object bounding box to the (1_n)-th object bounding box and regions corresponding to the (2_1)-st object bounding box to the (2_m)-th object bounding box through the visual encoder.

As one example, at the process of (II), the processor generates the caption losses either by referring to similarities between all of the second object category names of the pseudo labels and all of the image captions, or by referring to similarities between part of one or more key words, noun phrases, and verbs extracted from each of the second object category names and part of one or more key words, noun phrases, and verbs extracted from each of the image captions.

15. The learning device of claim 10, wherein, at the process of (II), the processor generates (i) class losses by referring to predicted class names of the first objects and the first object category names of the GT labels, wherein the predicted class names are acquired by referring to the object detection results, and (ii) the visual grounding losses by referring to the class losses and bounding box losses, wherein the bounding box losses are generated by referring to the proposals and the first object bounding boxes of the GT labels.

As one example, the processor generates the class losses by using contrastive losses between (1) the proposal embedding vectors and (2) the first text embedding vectors corresponding to the first object category names.

As one example, at the process of (II), the processor generates the bounding box losses by using L1 losses and GIOU (Generalized Intersection Over Union) losses, which are generated by referring to the proposals and the first object bounding boxes.

As one example, the pseudo labels including the second object bounding boxes corresponding to the second objects of the training image and the second object category names corresponding to the second objects of the training image are generated through a vision foundation model.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

FIG. 2 is a drawing schematically illustrating a flowchart of training the visual grounding model by using the pseudo label in accordance with one example embodiment of the present disclosure.

DETAILED DESCRIPTION OF THE PREFERRED EMBODIMENTS

Figure 1:
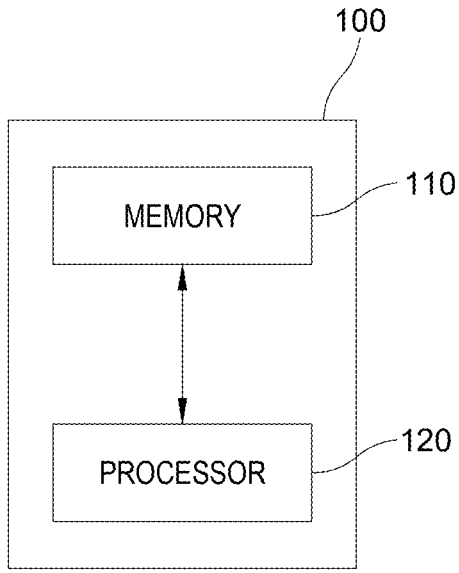
FIG. 1 is a drawing schematically illustrating a learning device used for training a visual grounding model by using at least one pseudo label in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention.

Furthermore, throughout the detailed description and claims of the present invention, the word "including" and its variations are not intended to exclude other technical features, additions, components, or steps. Other objects, advantages, and features of the present invention will become apparent to one of ordinary skill in the art, some from this specification and some from example embodiments of the present invention. The examples and drawings below are provided as illustrations and are not intended to limit the present invention.

Moreover, the present invention encompasses all possible combinations of the embodiments set forth in this specification. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views. In the drawings, like numerals refer to the same or similar features throughout the several aspects.

The title or abstract of the present invention provided herein are provided merely for convenience, and they do not limit or construe the scope or meaning of these embodiments.

For reference, even if each of the constituent elements is described singularly below, the possibility of plurality is not excluded.

To allow those skilled in the art to carry out the present invention easily, the example embodiments of the present invention by referring to attached diagrams will be explained in detail as shown below.

FIG. 1 is a drawing schematically illustrating a learning device used for training a visual grounding model by using one or more pseudo labels in accordance with one example embodiment of the present disclosure.

Referring to FIG. 1, the learning device 100 may include a memory 110 to store instructions for using the pseudo labels of an image to train the visual grounding model and a processor 120 for performing processes of using the pseudo labels of the image to train the visual grounding model according to the instructions stored in the memory 110 in accordance with one example embodiment of the present disclosure. Herein, the learning device 100 may include a server, a PC (Personal Computer), a laptop, a workstation, a tablet, a mobile computer, a PDA/EDA, a mobile phone, a smart phone, an IoT device, etc. (i.e., a variety of computing devices).

Specifically, the learning device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific manner as the computer software.

Also, the processor may include hardware configuration of MPU (Micro Processing Unit) or CPU (Central Processing Unit), cache memory, data bus, etc. Additionally, any OS (operating system) and software configuration of applications that achieve specific purposes may be further included.

Such description of the computing device does not exclude an integrated device including any combination of a processor, a memory, a medium, or any other computing components for implementing the present disclosure.

Processes for training the visual grounding model using the pseudo labels for the image by the learning device 100 will be described with reference to FIGS. 2 to 3C, and testing processes performed after training the visual grounding model will be described with reference to FIG. 4.

For reference, in this specification, a value generated through a visual encoder, which is included in the visual grounding model, by embedding the entirety of a training image may correspond to the image embedding vector, values generated through the visual encoder by embedding cropped images corresponding to regions of first object bounding boxes in the training image may correspond to first visual embedding vectors, and values generated through the visual encoder by embedding cropped images corresponding to regions of second object bounding boxes in the training image may correspond to the second visual embedding vectors. Furthermore, values generated through a text encoder, which is included in the visual grounding model, by embedding first object category names may correspond to first text embedding vectors, and values generated through the text encoder by embedding second object category names may correspond to second text embedding vectors.

FIG. 2 is a drawing schematically illustrating a flowchart of training the visual grounding model by using the pseudo labels in accordance with one example embodiment of the present disclosure.

Referring to FIG. 2, at least one training data including (1) a training image, (2) one or more GT labels including one or more first object bounding boxes and one or more first object category names, each of which corresponds to one or more first objects located within the training image, and (3) one or more pseudo labels including one or more second object bounding boxes and one or more second object category names, each of which corresponds to one or more second objects located within the training image may be acquired at a step of S210.

As one example, the first object category names may correspond to category names with limited number of categories, such as the COCO dataset, each being short-phrase coarse-grained category names, e.g., a person, an automobile, a bicycle, a tree, and the like. Furthermore, the second object category names may be fine-grained names each configured as noun phrases or longer sentence forms, such as "damaged box" or "minor scratch," and may be used for an extension to an open-world object detection. However, since the pseudo labels may include the second object bounding boxes and the second object category names for the second objects on the training image generated through the vision foundation model, lengths of the second object category names may vary depending on setting values of the vision foundation model. Further, even without using the vision foundation model, a labeler could generate the second object bounding boxes and the second object category names for the second objects on the training image by using a labeling tool, however, this approach may not be suitable in terms of an efficiency of dataset construction.

Herein, the GT labels and the pseudo-labels may be generalized as below with the training image including n number of the first objects and m number of the second objects. Herein, n and m may be integers greater than or equal to 1.

Specifically, the GT labels may include the first object bounding boxes and the first object category names, herein, (i) (i–1) the first object bounding boxes may include a (1_1)-st object bounding box to a (1_n)-th object bounding box corresponding to a (1_1)-st object to a (1_n)-th object included in the first objects and (i–2) the first object category names may include a (1_1)-st object category name to a (1_n)-th object category name corresponding to the (1_1)-st object to the (1_n)-th object. Furthermore, the pseudo labels may include the second object bounding boxes and the second object category names, herein, (ii) (ii–1) the second object bounding boxes may include a (2_1)-st object bounding box to a (2_m)-th object bounding box corresponding to a (2_1)-st object to a (2_m)-th object included in the second objects and (ii–2) the second object category names may include a (2_1)-st object category name to a (2_m)-th object category name corresponding to the (2_1)-st object to the (2_m)-th object.

Afterwards, the learning device 100 may input the training image and the first object category names into the visual grounding model, to thereby instruct the visual grounding model to generate one or more object detection results by detecting the first objects corresponding to the first object category names in the training image, at a step of S221.

Specifically, the visual grounding model may include the visual encoder, a detection head, etc., and the learning device 100 may (i) input the training image and the first object category names to the visual grounding model, to thereby instruct the visual grounding model to (i–1) generate one or more first text embedding vectors by embedding the first object category names through the text encoder, (i–2) generate the image embedding vector by embedding the training image through the visual encoder, and (i–3) (i–3-a) generate one or more proposals, which are regions in the training image where objects are predicted to be located, by using the image embedding vector through the detection head, (i–3-b) align each of proposal embedding vectors of the proposals with each of the corresponding first text embedding vectors, and thus (i–3-c) generate one or more object detection results of detecting the first objects corresponding to the first object category names in the training image. For reference, the detection head may be configured as a combination of a detection transformer (DETR) and a detection transformer decoder, but it is not limited thereto.

Additionally, the learning device 100 may input, to the visual grounding model, one or more cropped images acquired by cropping one or more regions in the training image corresponding to said one or more second object bounding boxes of said one or more pseudo labels, to thereby allow the visual grounding model to generate one or more second visual embedding vectors by embedding the cropped images through the visual encoder, and thus generate one or more image captions corresponding to said one or more cropped images by inputting the second visual embedding vectors to a caption decoder, at a step of S222.

It is to be appreciated that the step of S222 may be performed prior to or subsequent to the step of S221, or may be performed simultaneously with the step of S221. Furthermore, the step of S222 may correspond to a preliminary process performed for the purpose of ensuring that the fine-grained category names included in the pseudo labels are well reflected on an embedding space of the visual grounding model, by distinguishing the pseudo labels from the GT labels. Moreover, the caption decoder may be a model that receives the visual embedding vector and generates a caption for the corresponding image, and may be a component that is not included in the visual grounding model (as the case may be) and may be a component that is not used after a training process is completed, but is not limited thereto.

Additionally, the learning device 100 may generate one or more visual grounding losses by referring to the GT labels and the object detection results, at a step of S231, generate one or more caption losses by referring to the image captions and the pseudo labels, at a step of S232, and generate one or more contrastive losses by referring to similarities between each of (1) the first text embedding vectors and the second text embedding vectors, each of which is respectively acquired by embedding the first object category names and embedding the second object category names through the text encoder, and (2) the visual embedding vectors and the second visual embedding vectors, each of which is respectively acquired by embedding one or more regions corresponding to the first object bounding boxes and embedding one or more regions corresponding to the second object bounding boxes through the visual encoder, at a step of S233.

For reference, each of the step of S231 through the step of S233 may be performed sequentially or simultaneously, or an order may be determined arbitrarily and performed according to a judgment of those skilled in the art.

Finally, the learning device 100 may train the visual grounding model and the caption decoder by using at least part of the visual grounding losses, the caption losses, and the contrastive losses, at a step of S240, to thereby allow the visual grounding model to expand to an open-world object detection through the pseudo labels while maintaining an object detection performance for the GT labels.

The overall process for training the visual grounding model has been described schematically with reference to FIG. 2, and specific processes for training the visual grounding model will be described with reference to FIGS. 3A to 3C.

Figure 3A:
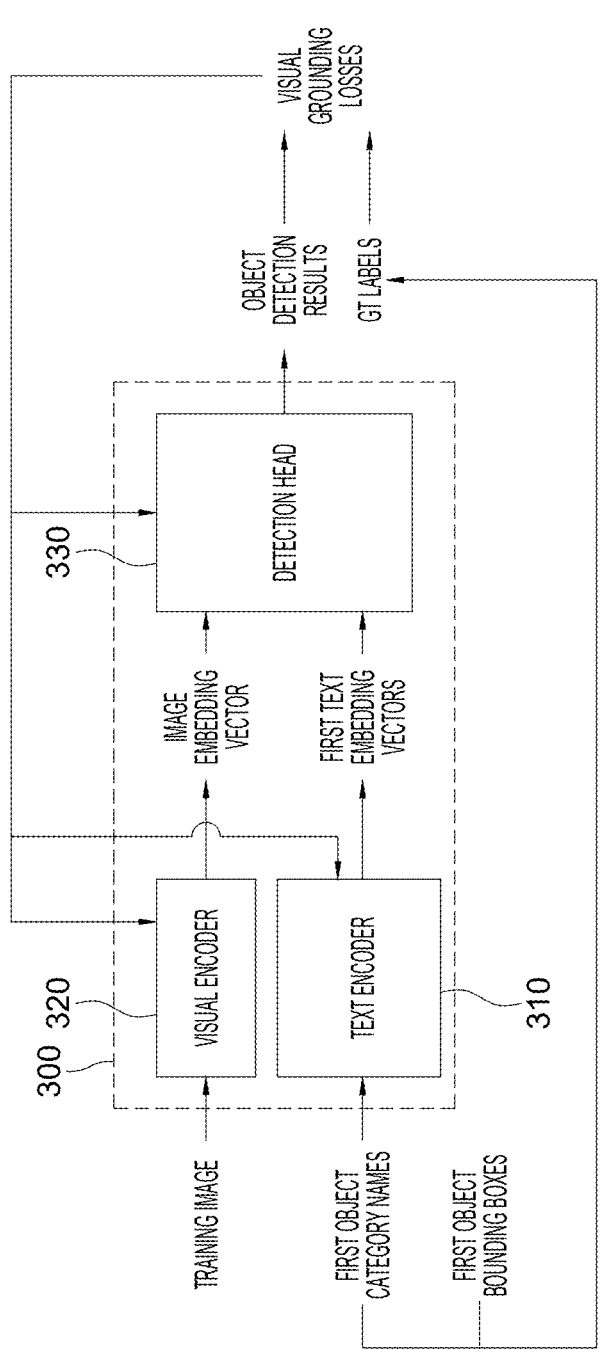
FIGS. 3A to 3C are drawings schematically illustrating processes of training the visual grounding model by using the pseudo label in accordance with one example embodiment of the present disclosure.
Figure 3B:
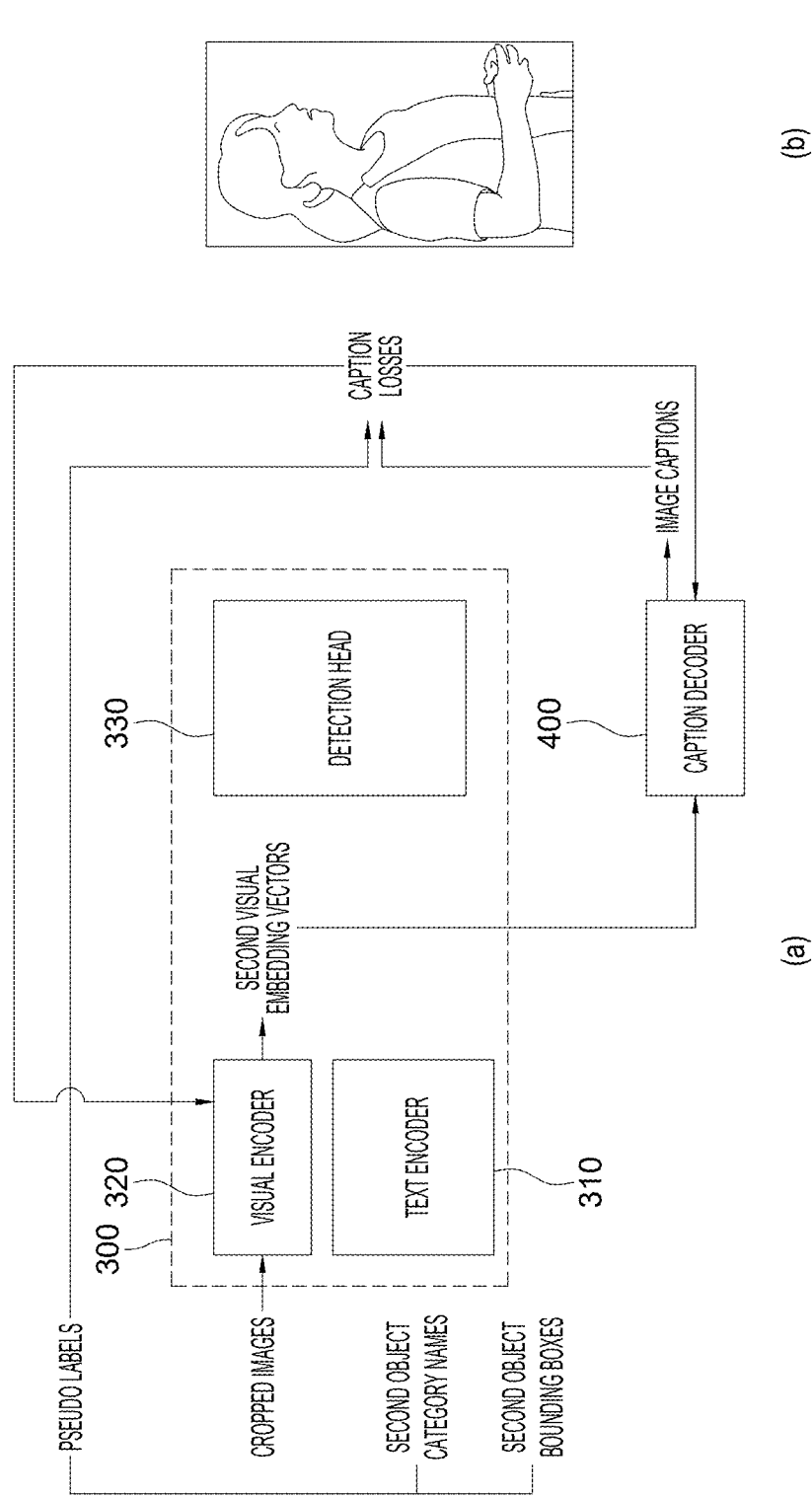
Figure 3C:
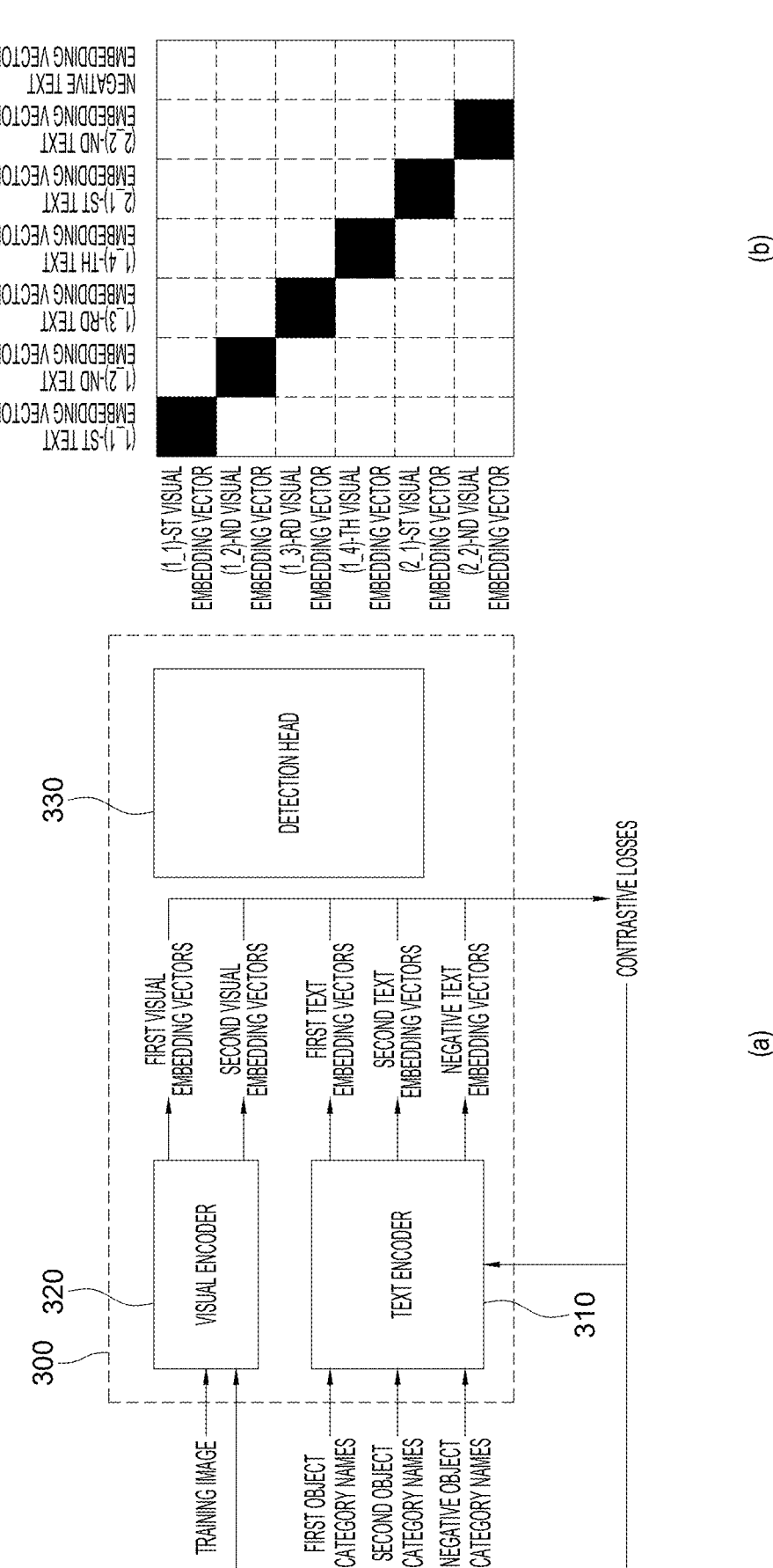

FIGS. 3A to 3C are drawings schematically illustrating processes of training the visual grounding model by using the pseudo labels in accordance with one example embodiment of the present disclosure.

For reference, FIG. 3A illustrates a process for generating the visual grounding losses and a process of training by using them, FIG. 3B illustrates a process for generating the caption losses and training by using them, and FIG. 3C illustrates a process for generating the contrastive losses and training by using them. And, as previously described with reference to FIG. 2, each of processes for each of FIGS. 3A through 3C may be performed sequentially or simultaneously, or may be performed in an arbitrary order chosen by those skilled in the art.

First, by referring to FIG. 3A, the learning device 100 may input the training image and the first object category names to the visual grounding model 300, to thereby instruct the visual grounding model 300 to (i–1) generate the first text embedding vectors by embedding the first object category names through the text encoder 310, (i–2) generate the image embedding vector by embedding the training image through the visual encoder 320, and (i–3) (i–3-a) generate the proposals, which are the regions in the training image where the objects are predicted to be located, by using the image embedding vector through the detection head 330, (i–3-b) align each of proposal embedding vectors of the proposals with each of the corresponding first text embedding vectors, and thus (i–3-c) generate said one or more object detection results of detecting the first objects corresponding to the first object category names in the training image.

Herein, the detection head 330 may (i) generate said one or more proposals through deformable cross attention, which performs an attention operation only on small key sampling points around a reference point on the training image by utilizing a multi-scale based image embedding vector, and, (ii) in response to matching the proposal embedding vectors and the first text embedding vectors, those are assigned with a high value and aligned together, to thereby generate the object detection results by referring to detection queries generated according to the alignment results.

Further, the learning device 100 may generate (i) class losses by referring to predicted class names of the first objects and the first object category names of the GT labels and (ii) bounding box losses by referring to the proposals and the first object bounding boxes of the GT labels. Herein, the predicted class names are acquired by referring to the object detection results. Furthermore, the visual grounding losses may be generated by referring to the class losses and bounding box losses.

As an example, should GLIP (Grounded Language-Image Pre-training) be used as the visual grounding model 300, the learning device 100 may generate the class losses by using contrastive losses based on the similarities between the proposal embedding vectors of the proposals and the first text embedding vectors of the first object category names included in the GT labels. For reference, the contrastive losses described in FIG. 3A are used to generate the class losses (i.e., sub-element for generating the visual grounding losses) based on similarities between each of the proposal embedding vectors for the proposals and each of the first text embedding vectors. In contrast, the contrastive losses to be described later in FIG. 3C differs in that they are used to directly train the visual grounding model 300 (i.e., specifically, the text encoder 310 and the visual encoder 320) based on each of similarities between each of the first visual embedding vectors and the second visual embedding vectors and each of the first text embedding vectors and the second text embedding vectors.

Additionally, as an example, if the detection transformer and the detection transformer decoder are used as the detection head 330, the learning device 100 may generate L1 losses and GIOU (Generalized Intersection Over Union) losses between the proposals and the first object bounding boxes by referring to the proposals and the first object bounding boxes included in the GT labels. Moreover, the bounding box losses may be generated by using the L1 losses and the GIOU losses.

Further, the learning device 100 may train the text encoder 310, the visual encoder 320, and the detection head 330, in its entirety (i.e., the visual grounding model 300), through backpropagating the visual grounding losses.

Next, by referring to (a) of FIG. 3B, the learning device 100 may (i) input, to the visual grounding model 300, the cropped images acquired by cropping the regions in the training image corresponding to the second object bounding boxes of the pseudo labels, to thereby allow the visual grounding model to generate the second visual embedding vectors by embedding the cropped images through the visual encoder 320, and (ii) input, to the caption decoder 400, the second visual embedding vectors, to thereby allow the caption decoder 400 to generate the image captions corresponding to the cropped images. Herein, the caption decoder 400 may not be included in the visual grounding model 300 and may be an added component configured to generate the image captions for the cropped images.

Further, by referring to (b) of FIG. 3B, an example of a cropped image is illustrated. Herein, a second object category name included in a pseudo label corresponding to the cropped image may be described in a sentence format, such as: "The upper body of an Asian woman dressed in nurse's uniform with her hands clasped".

Furthermore, the learning device 100 may generate one or more caption losses by referring to the image captions and the pseudo labels. More specifically, the caption losses may be generated by referring to similarities between the image captions and the second object category names included in the pseudo labels, and then the visual encoder 320 and the caption decoder 400 may be trained by backpropagating the generated caption losses. That is, the image captions generated by the caption decoder 400 may be determined as predicted values, and the second object category names may be determined as GT values corresponding to the image captions. Further, the pseudo labels may be distinguished from the GT labels, and accordingly separate caption losses that are not the visual grounding losses may be generated. For reference, during the training process, the caption decoder 400 may be trained to ensure that the image embedding vector, which is generated by embedding the training image through the visual encoder 320, may better capture the fine-grained category names than before, but since the caption decoder 400 itself is not used in a visual grounding process, the caption decoder 400 may be removed after the training is completed.

Herein, the learning device 100 may generate the caption losses by referring to similarities between all of the second object category names and all of the image captions, however, as previously described, if the second object category names appear in long sentence forms, it may be difficult to ensure that the image captions exactly match the second object category names. Therefore, the caption losses may be generated by referring to similarities between part of one or more key words, noun phrases, and verbs extracted from each of the second object category names and part of one or more key words, noun phrases, and verbs extracted from each of the image captions. For instance, the learning device

100 may extract main words such as "Asian," "woman," "nurse," and "uniform" from the example of the second object category name described in (b) of FIG. 3B and extract similar main words from the image caption. By referring to the similarities between these extracted words, the caption losses may be generated, thereby allowing the training process to be performed to ensure that the image captions are semantically consistent with the second object category names.

Next, by referring to (a) of FIG. 3C, in response to acquiring (1) the training image, (2) the GT labels including the first object category names, (3) the pseudo labels including the second object category names, and (4) one or more negative object category names that are different from the first object category names and the second object category names, the learning device 100 may (i) input the first object category names, the second object category names, and the negative object category names to the visual grounding model 300, to thereby allow the visual grounding model 300 to instruct the text encoder 310 to generate each of the first text embedding vectors, the second text embedding vectors, and one or more negative text embedding vectors, and (ii) input the training image (or the cropped images acquired by cropping the regions corresponding to the first object bounding boxes and the second object bounding boxes) to the visual grounding model 300, to thereby allow the visual grounding model 300 to instruct the visual encoder 320 to generate the first visual embedding vectors and the second visual embedding vectors by embedding the respective regions corresponding to the first object bounding boxes and the second object bounding boxes in the training image.

Further, the learning device 100 may generate the contrastive losses by referring to the similarities between (1) each of the first text embedding vectors and the second text embedding vectors and (2) each of the first visual embedding vectors and the second visual embedding vectors and then may train the text encoder 310 and the visual encoder 320 by backpropagating the contrastive losses. However, since the negative category names are not necessarily required in FIG. 3C, processes for generating the contrastive losses without including the negative category names will be described first and then processes for generating the contrastive losses with the negative category names will be described later.

First, for a case where the negative category names are not included, as explained by referring to FIG. 2, on condition that the GT labels include the (1_1)-st object bounding box to the (1_n)-th object bounding box corresponding to the (1_1)-st object to the (1_n)-th object and the (1_1)-st object category name to the (1_n)-th object category name corresponding to the (1_1)-st object to the (1_n)-th object, and the pseudo labels include the (2_1)-st object bounding box to the (2_m)-th object bounding box corresponding to the (2_1)-st object to the (2_m)-th object and the (2_1)-st object category name to the (2_m)-th object category name corresponding to the (2_1)-st object to the (2_m)-th object, the learning device 100 may (i) input the (1_1)-st object category name to the (1_n)-th object category name and the (2_1)-st object category name to the (2_m)-th object category name to the visual grounding model 300, to thereby allow the visual grounding model 300 to generate each of a (1_1)-st text embedding vector to a (1_n)-th text embedding vector and a (2_1)-st text embedding vector to a (2_m)-th text embedding vector, through the text encoder 310, by respectively embedding each of the (1_1)-st object category name to the (1_n)-th object category and the (2_1)-st object category name to the (2_m)-th object category name, and (ii)

input the training image (or cropped images acquired by cropping each of regions corresponding to the (1_1)-st object bounding box to the (1_n)-th object bounding box and the (2_1)-st object bounding box to the (2_m)-th object bounding box) to the visual grounding model 300, to thereby allow the visual grounding model 300 to generate a (1_1)-st visual embedding vector to a (1_n)-th visual embedding vector and a (2_1)-st visual embedding vector to a (2_m)-th visual embedding vector, through the visual encoder 320, by embedding the respective regions corresponding to the (1_1)-st object bounding box to the (1_n)-th object bounding box and the (2_1)-st object bounding box to the (2_m)-th object bounding box.

Further, the learning device 100 may generate contrastive losses by referring to the similarities between (1) each of the (1_1)-st text embedding vector to the (1_n)-th text embedding vector and the (2_1)-st text embedding vector to the (2_m)-th text embedding vector, and (2) each of the (1_1)-st visual embedding vector to the (1_n)-th visual embedding vector and the (2_1)-st visual embedding vector to the (2_m)-th visual embedding vector, and may train the text encoder 310 and the visual encoder 320 by backpropagating the contrastive losses.

Specifically, considering that the "negative text embedding vector" is absent in (b) of FIG. 3C, it can be seen that a matrix is illustrated with the (1_1)-st visual embedding vector to the (1_n)-th visual embedding vector and the (2_1)-st visual embedding vector to the (2_m)-th visual embedding vector are enumerated in rows, and the (1_1)-st text embedding vector to the (1_n)-th text embedding vector and the (2_1)-st text embedding vector to the (2_m)-th text embedding vector are enumerated in columns. For instance, the learning device 100 may calculate similarities of the (1_1)-st visual embedding vector with each of the (1_1)-st text embedding vector to the (1_n)-th text embedding vector and the (2_1)-st text embedding vector to the (2_m)-th text embedding vector. Further, by referring to the calculated similarities, the learning device 100 may determine the (1_1)-st text embedding vector, which matches the (1_1)-st visual embedding vector, to be "1" as indicated by black and determine remaining text embedding vectors as "0". Similarly, for each of a (1_2)-nd visual embedding vector to the (1_n)-th visual embedding vector and the (2_1)-st visual embedding vector to the (2_m)-th visual embedding vector, the similarities with the text embedding vectors may be calculated, and based on the similarities, matching text embedding vectors may be determined to be "1" and remaining text embedding vectors may be determined to be "0". For reference, (b) of FIG. 3C illustrates an example where n is 4 and m is 2, and it is to be appreciated that n and m may each correspond to an integer equal to or greater than 1. However, while the description above was explained on determining similarities with the text embedding vectors based on the visual embedding vectors, conversely, similarities with the visual embedding vectors could also be determined based on the text embedding vectors.

Furthermore, the learning device 100 may calculate the contrastive losses by using InfoNCE losses as used in CLIP (Contrastive Language-Image Pre-Training) or sigmoid losses as used in SigLIP (Sigmoid loss for Language-Image Pre-training), based on the similarities calculated in (b) of FIG. 3C.

Moreover, the learning device 100 may generate the contrastive losses by using only a subset of the pseudo labels corresponding to a subset of the second object bounding boxes, with IOUs (Intersection Over Union) between the subset of the second object bounding boxes and the first object bounding boxes of the GT labels being less than or equal to a preset threshold IOU. That is, for objects in the training image where the GT labels and the pseudo labels overlap, the visual grounding model will only use the GT labels to generate the contrastive losses, and for objects where only the pseudo labels exist, the pseudo labels will be used to generate the contrastive losses.

For instance, although in the example in (b) of FIG. 3C illustrates the (1_1)-st visual embedding vector to a (1_4)-th visual embedding vector, the (2_1)-st visual embedding vector, and a (2_2)_nd visual embedding vector as corresponding to mutually different objects, if an IOU between the (1_1)-st object bounding box corresponding to the (1_1)-st visual embedding vector and the (2_1)-st object bounding box corresponding to the (2_1)-st visual embedding vector exceeds the preset threshold IOU (that is, they are determined to be the same object), the learning device 100 may generate the contrastive losses after deleting the (2_1)-st visual embedding vector and the (2_1)-st text embedding vector from the matrix illustrated in (b) of FIG. 3C.

Next, in case the negative object category names that are different from the first object category names and the second object category names are acquired, the learning device 100 may additionally input the negative object category names to the visual grounding model 300, to thereby allow the visual grounding model 300 to generate the negative text embedding vectors through the text encoder 310 by embedding the negative object category names. Further, the learning device 100 may generate the contrastive losses by additionally adding the negative text embedding vectors to the matrix described above.

Herein, the negative text embedding vectors are added for a purpose of not producing high similarities between the negative text embedding vectors and any of the first visual embedding vectors, which are generalized as the (1_1)-st visual embedding vector to the (1_n)-th visual embedding vector, or between the negative text embedding vectors and any of the second visual embedding vectors, which are generalized as the (2_1)-st visual embedding vector to the (2_m)-th visual embedding vector. And although (b) of FIG. 3C illustrates one negative text embedding vector, a plurality of negative text embedding vectors may also be used. However, if the number of negative text embedding vectors becomes excessively large, an imbalance between matching embedding vectors (i.e., those determined to be "1") and non-matching embedding vectors (i.e., those determined to be "0") may become severe. Therefore, an appropriate number of negative text embedding vectors may be used according to a judgment of a person skilled in the art.

Specifically, by referring to (b) of FIG. 3C, it can be seen that the matrix is illustrated with the (1_1)-st visual embedding vector to the (1_n)-th visual embedding vector and the (2_1)-st visual embedding vector to the (2_m)-th visual embedding vector are enumerated in rows, while the (1_1)-st text embedding vector to the (1_n)-th text embedding vector, the (2_1)-st text embedding vector to the (2_m)-th text embedding vector, and the negative text embedding vectors are enumerated in columns.

Figure 4:
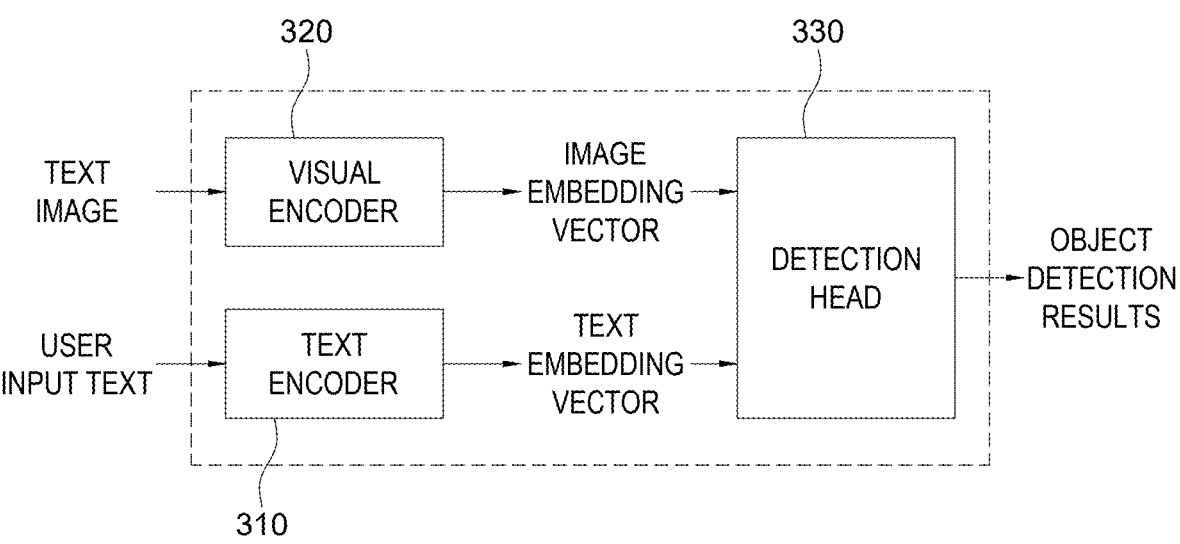
FIG. 4 is a drawing schematically illustrating testing processes for testing a trained visual grounding model in accordance with one example embodiment of the present disclosure.

FIG. 4 is a drawing schematically illustrating testing processes for testing a trained visual grounding model in accordance with one example embodiment of the present disclosure.

On condition that the visual grounding model 300 and the caption decoder 400 are trained by using at least part of (1) the visual grounding losses as illustrated in FIG. 3A, (2) the caption losses as illustrated in FIG. 3B, and (3) the contrastive losses as illustrated in FIG. 3C, a testing image and a user input text for performing visual grounding process is inputted into the visual grounding model 300. Then the visual grounding model 300 may (i) instruct the text encoder 310 to generate a text embedding vector by embedding the user input text, (ii) instruct the visual encoder 320 to generate an image embedding vector by encoding the testing image, and (iii) instruct the detection head 330 to generate one or more proposals, which are regions in the testing image where objects are predicted to be located, by using the image embedding vector, to thereby align proposal embedding vectors corresponding to the proposals with the text embedding vector, and thus generate one or more object detection results for objects corresponding to the user input text. Through this, the present invention enables the visual grounding model 300 to maintain the object detection performance for the coarse-grained category names corresponding to the GT labels, while improving the object detection performance for the fine-grained category names corresponding to the user input text, which may be expressed as phrases or sentences, thereby enabling expansion to the open-world object detection.

The present disclosure has an effect of improving the open-world object detection performance of the visual grounding model while maintaining the object detection performance of the visual grounding model for the existing GT labels, by adding pseudo labels generated from a visual foundation model to an existing training data for training the visual grounding model and by differentiating each of the losses utilized by each of the existing Ground Truth (GT) labels and the pseudo-labels.

The embodiments of the present disclosure as explained above can be implemented in a form of executable program command through a variety of computer means recordable to computer readable media. The program commands recorded to the media may be components specially designed for the present disclosure or may be usable to a skilled human in a field of computer software. The computer readable media may include solely or in combination, program commands, data files, and data structures. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. The examples of program commands include not only machine language code produced by a compiler, but also high-level language code that can be executed by a computer using an interpreter or the like. Additionally, the computing device may further include operating system (OS) and software module configuration of applications that achieve specific purposes, and vice versa.

The present invention has been described above with specific matters such as specific components and limited embodiments and drawings. However, this is provided only for the purpose of assisting the overall understanding of the present invention, and the present invention is not limited to the above embodiments, and one of ordinary skill in the art to which the present invention pertains may attempt various modifications and variations from this description.

Accordingly, the scope of the present invention should not be determined by being limited to the embodiments described above, and all those things that are equivalent or equivalently modified to the claims to be described later, as well as the claims themselves, shall be deemed to fall within the scope of the spirit of the present invention.

What is claimed is:

1. A method for training a visual grounding model by using a pseudo label of an image, comprising steps of:

(a) in response to acquiring, by a learning device, training data including (1) a training image, (2) one or more GT labels including one or more first object bounding boxes and one or more first object category names, each of which corresponds to one or more first objects located within the training image, and (3) one or more pseudo labels including one or more second object bounding boxes and one or more second object category names, each of which corresponds to one or more second objects located within the training image, which are either same objects as the first objects or different objects, wherein the first object category names are coarse-grained category names corresponding to the first objects and the second object category names are fine-grained category names corresponding to the second objects, performing, by the learning device, sub-processes of (i) inputting the training image and the first object category names to the visual grounding model, to thereby allow the visual grounding model to (i–1) generate one or more first text embedding vectors by embedding the first object category names through a text encoder, (i–2) generate an image embedding vector by embedding the training image through a visual encoder, (i–3) generate one or more proposals, which are regions in the training image where objects are predicted to be located, by using the image embedding vector through a detection head, to thereby align each of proposal embedding vectors of the proposals with each of the corresponding first text embedding vectors, and thus generate one or more object detection results of detecting the first objects corresponding to the first object category names in the training image, and (ii) inputting, to the visual grounding model, one or more cropped images acquired by cropping one or more regions in the training image corresponding to said one or more second object bounding boxes of said one or more pseudo labels, to thereby allow the visual grounding model to generate one or more second visual embedding vectors by embedding the cropped images through the visual encoder, and thus generate one or more image captions corresponding to said one or more cropped images by inputting the second visual embedding vectors to a caption decoder; and (b) performing, by the learning device, a sub-process of generating one or more visual grounding losses by referring to the GT labels and the object detection results, a sub-process of generating one or more caption losses by referring to the image captions and the pseudo labels, and a sub-process of generating one or more contrastive losses by referring to similarities between each of (1) the first text embedding vectors and one or more second text embedding vectors, each of which is respectively acquired by embedding the first object category names of the GT labels and embedding the second object category names of the pseudo labels through the text encoder, and (2) one or more first visual embedding vectors and the second visual embedding vectors, each of which is respectively acquired by embedding one or more regions corresponding to the first object bounding boxes of the GT labels and embedding one or more regions corresponding to the second object bounding boxes of the pseudo labels through the visual encoder, to thereby train the visual grounding model and the caption decoder by using at least part of the visual grounding losses, the caption losses, and the contrastive losses.

2. The method of claim 1, wherein, at the step of (b), while generating the contrastive losses by referring to the similarities between (1) each of the first text embedding vectors and the second text embedding vectors and (2) each of the first visual embedding vectors and the second visual embedding vectors, the learning device generates the contrastive losses by using only a subset of the pseudo labels corresponding to a subset of the second object bounding boxes, wherein IOUs (Intersection Over Union) between the subset of the second object bounding boxes and the first object bounding boxes of the GT labels are less than or equal to a preset threshold IOU.

3. The method of claim 1, wherein, at the step of (b), the learning device generates the contrastive losses by using additional one or more negative text embedding vectors acquired by embedding one or more negative object category names through the text encoder, wherein the negative object category names are category names that are different from the first object category names and the second object category names.

4. The method of claim 1, wherein, at the step of (a), the GT labels include the first object bounding boxes and the first object category names, wherein (i) (i–1) the first object bounding boxes include a (1_1)-st object bounding box to a (1_n)-th object bounding box corresponding to a (1_1)-st object to a (1_n)-th object included in the first objects and (i–2) the first object category names include a (1_1)-st object category name to a (1_n)-th object category name, and the pseudo labels include the second object bounding boxes and the second object category names, wherein (ii) (ii–1) the second object bounding boxes include a (2_1)-st object bounding box to a (2_m)-th object bounding box corresponding to a (2_1)-st object to a (2_m)-th object included in the second objects and (ii–2) the second object category names include a (2_1)-st object category name to a (2_m)-th object category name, and wherein, at the step of (b), the learning device generates the contrastive losses by referring to similarities between (1) each of a (1_1)-st text embedding vector to a (1_n)-th text embedding vector and a (2_1)-st text embedding vector to a (2_m)-th text embedding vector, each of which is respectively acquired by embedding each of the (1_1)-st object category name to the (1_n)-th object category and the (2_1)-st object category name to the (2_m)-th object category name through the text encoder, and (2) each of a (1_1)-st visual embedding vector to a (1_n)-th visual embedding vector and a (2_1)-st visual embedding vector to a (2_m)-th visual embedding vector, each of which is respectively acquired by embedding each of regions corresponding to the (1_1)-st object bounding box to the (1_n)-th object bounding box and regions corresponding to the (2_1)-st object bounding box to the (2_m)-th object bounding box through the visual encoder.

5. The method of claim 1, wherein, at the step of (b), the learning device generates the caption losses either by referring to similarities between all of the second object category names of the pseudo labels and all of the image captions, or by referring to similarities between part of one or more key words, noun phrases, and verbs extracted from each of the second object category names and part of one or more key words, noun phrases, and verbs extracted from each of the image captions.

6. The method of claim 1, wherein, at the step of (b), the learning device generates (i) class losses by referring to predicted class names of the first objects and the first object category names of the GT labels, wherein the predicted class names are acquired by referring to the object detection results, and (ii) the visual grounding losses by referring to the class losses and bounding box losses, wherein the bounding box losses are generated by referring to the proposals and the first object bounding boxes of the GT labels.

7. The method of claim 6, wherein the learning device generates the class losses by using contrastive losses between (1) the proposal embedding vectors and (2) the first text embedding vectors corresponding to the first object category names.

8. The method of claim 6, wherein, at the step of (b), the learning device generates the bounding box losses by using L1 losses and GIOU (Generalized Intersection Over Union) losses, which are generated by referring to the proposals and the first object bounding boxes.

9. The method of claim 1, wherein the pseudo labels including the second object bounding boxes corresponding to the second objects of the training image and the second object category names corresponding to the second objects of the training image are generated through a vision foundation model.

10. A learning device for training a visual grounding model by using a pseudo label of an image, comprising:

at least one memory that stores instructions; and at least one processor configured to execute the instructions to perform processes of: (I) in response to acquiring training data including (1) a training image, (2) one or more GT labels including one or more first object bounding boxes and one or more first object category names, each of which corresponds to one or more first objects located within the training image, and (3) one or more pseudo labels including one or more second object bounding boxes and one or more second object category names, each of which corresponds to one or more second objects located within the training image, which are either same objects as the first objects or different objects, wherein the first object category names are coarse-grained category names corresponding to the first objects and the second object category names are fine-grained category names corresponding to the second objects, (i) inputting the training image and the first object category names to the visual grounding model, to thereby allow the visual grounding model to (i–1) generate one or more first text embedding vectors by embedding the first object category names through a text encoder, (i–2) generate an image embedding vector by embedding the training image through a visual encoder, (i–3) generate one or more proposals, which are regions in the training image where objects are predicted to be located, by using the image embedding vector through a detection head, to thereby align each of proposal embedding vectors of the proposals with each of the corresponding first text embedding vectors, and thus generate one or more object detection results of detecting the first objects corresponding to the first object category names in the training image, and (ii) inputting, to the visual grounding model, one or more cropped images acquired by cropping one or more regions in the training image corresponding to said one or more second object bounding boxes of said one or more pseudo labels, to thereby allow the visual grounding model to generate one or more second visual embedding vectors by embedding the cropped images through the visual encoder, and thus generate one or more image captions corresponding to said one or more cropped images by inputting the second visual embedding vectors to a caption decoder; and (II) generating one or more visual grounding losses by referring to the GT labels and the object detection results, generating one or more caption losses by referring to the image captions and the pseudo labels, and generating one or more contrastive losses by referring to similarities between each of (1) the first text embedding vectors and one or more second text embedding vectors, each of which is respectively acquired by embedding the first object category names of the GT labels and embedding the second object category names of the pseudo labels through the text encoder, and (2) one or more first visual embedding vectors and the second visual embedding vectors, each of which is respectively acquired by embedding one or more regions corresponding to the first object bounding boxes of the GT labels and embedding one or more regions corresponding to the second object bounding boxes of the pseudo labels through the visual encoder, to thereby train the visual grounding model and the caption decoder by using at least part of the visual grounding losses, the caption losses, and the contrastive losses.

11. The learning device of claim 10, wherein, at the process of (II), while generating the contrastive losses by referring to the similarities between (1) each of the first text embedding vectors and the second text embedding vectors and (2) each of the first visual embedding vectors and the second visual embedding vectors, the processor generates the contrastive losses by using only a subset of the pseudo labels corresponding to a subset of the second object bounding boxes, wherein IOUs (Intersection Over Union) between the subset of the second object bounding boxes and the first object bounding boxes of the GT labels are less than or equal to a preset threshold IOU.

12. The learning device of claim 10, wherein, at the process of (II), the processor generates the contrastive losses by using additional one or more negative text embedding vectors acquired by embedding one or more negative object category names through the text encoder, wherein the negative object category names are category names that are different from the first object category names and the second object category names.

13. The learning device of claim 10, wherein, at the process of (I), the GT labels include the first object bounding boxes and the first object category names, wherein (i) (i–1) the first object bounding boxes include a (1_1)-st object bounding box to a (1_n)-th object bounding box corresponding to a (1_1)-st object to a (1_n)-th object included in the first objects and (i–2) the first object category names include a (1_1)-st object category name to a (1_n)-th object category name, and the pseudo labels include the second object bounding boxes and the second object category names, wherein (ii) (ii–1) the second object bounding boxes include a (2_1)-st object bounding box to a (2_m)-th object bounding box corresponding to a (2_1)-st object to a (2_m)-th object included in the second objects and (ii–2) the second object category names include a (2_1)-st object category name to a (2_m)-th object category name, and wherein, at the process of (II), the processor generates the contrastive losses by referring to similarities between (1) each of a (1_1)-st text embedding vector to a (1_n)-th text embedding vector and a (2_1)-st text embedding vector to a (2_m)-th text embedding vector, each of which is respectively acquired by embedding each of the (1_1)-st object category name to the (1_n)-th object category and the (2_1)-st object category name to the (2_m)-th object category name through the text encoder, and (2) each of a (1_1)-st visual embedding vector to a (1_n)-th visual embedding vector and a (2_1)-st visual embedding vector to a (2_m)-th visual embedding vector, each of which is respectively acquired by embedding each of regions corresponding to the (1_1)-st object bounding box to the (1_n)-th object bounding box and regions corresponding to the (2_1)-st object bounding box to the (2_m)-th object bounding box through the visual encoder.

14. The learning device of claim 10, wherein, at the process of (II), the processor generates the caption losses either by referring to similarities between all of the second object category names of the pseudo labels and all of the image captions, or by referring to similarities between part of one or more key words, noun phrases, and verbs extracted from each of the second object category names and part of one or more key words, noun phrases, and verbs extracted from each of the image captions.

15. The learning device of claim 10, wherein, at the process of (II), the processor generates (i) class losses by referring to predicted class names of the first objects and the first object category names of the GT labels, wherein the predicted class names are acquired by referring to the object detection results, and (ii) the visual grounding losses by referring to the class losses and bounding box losses, wherein the bounding box losses are generated by referring to the proposals and the first object bounding boxes of the GT labels.

16. The learning device of claim 15, wherein the processor generates the class losses by using contrastive losses between (1) the proposal embedding vectors and (2) the first text embedding vectors corresponding to the first object category names.

17. The learning device of claim 15, wherein, at the process of (II), the processor generates the bounding box losses by using L1 losses and GIOU (Generalized Intersection Over Union) losses, which are generated by referring to the proposals and the first object bounding boxes.

18. The learning device of claim 10, wherein the pseudo labels including the second object bounding boxes corresponding to the second objects of the training image and the second object category names corresponding to the second objects of the training image are generated through a vision foundation model.

\* \* \* \* \*